Figure 1:
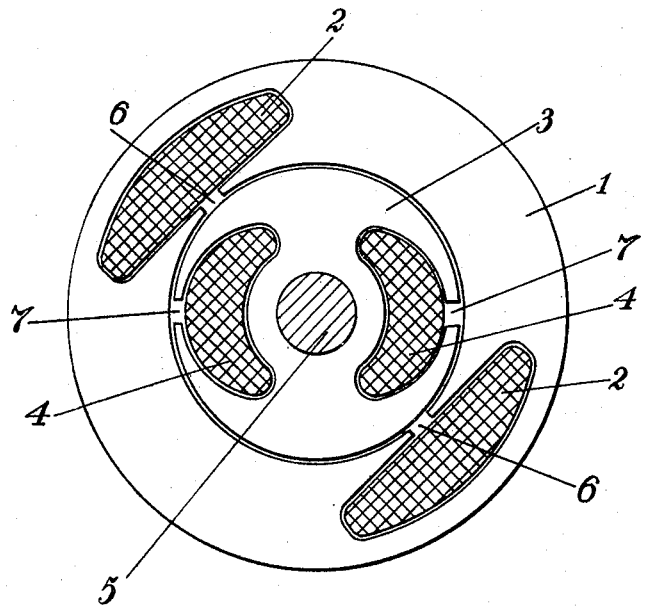

Sept. 23, 1952     J. BELL     2,611,891

VARIOMETER AND INDUCTION REGULATOR

Filed Dec. 27, 1949

Inventor
John Bell
By Glascock Downing Rutled
Attys.

Patented Sept. 23, 1952

2,611,891

UNITED STATES PATENT OFFICE 2,611,891

VARIOMETER AND INDUCTION REGULATOR

John Bell, Beckenham, England, assignor to Muirhead & Company Limited, Beckenham, England Application December 27, 1949, Serial No. 135,068
In Great Britain June 18, 1947

5 Claims. (Cl. 336—120)

This invention relates to variometers and induction regulators in which the winding of the stator and the winding of the rotor are each concentrated in two slots diametrically opposite each other and extending in a direction parallel with the axis of the rotor and stator and having common magnetic flux paths are rotatable coaxially with relation to each other. Either the stator or the rotor may be energised and serve as the primary of a transformer and the other member acting as the secondary will have induced in its winding a voltage dependent on the position of the one member with relation to the other.

Variometers and induction regulators of this kind are well known and their characteristic is that in general an approximately sinusoidal relation exists between the relative angular position of the two members and the voltage output of the secondary.

The object of the present invention is to provide a variometer or induction regulator in which the relation of voltage to angle is linear through a substantial range.

According to the invention this object is achieved by keeping the slot opening as narrow as is consistent with the practical construction of the parts so that the windings are substantially completely enclosed by the magnetic material of the rotor and stator; the remainder of the adjacent surfaces of the rotor and stator respectively, apart from the slots, are preferably made truly cylindrical and are coaxial with each other within the practical limits of manufacture.

The magnetic core material of which the stator and rotor are made, is preferably of high permeability laminations and the air gap between the members is long enough to be one of the controlling factors in the passage of flux between the rotor and stator.

The inter-linking flux between the stator and rotor will, therefore, if these conditions are fully realised, be a linear function of the relative angular positions of rotor and stator. Thus when the longitudinally extending coils of rotor and stator are in planes perpendicular one to the other, no voltage will be induced in the secondary winding and a linear voltage will be built up in either direction over approximately 80° of movement making a total effective range of 160°.

Additional windings may be provided on either rotor or stator, or both on the rotor and stator.

Further, the windings of the stator and rotor may be connected in series so that the variometer serves as a variable inductance.

Figure 2:
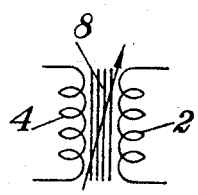
Figure 3:
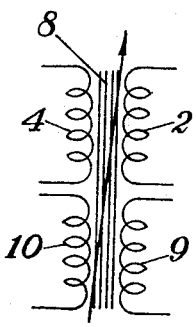
Figure 4:
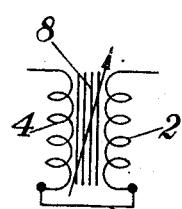

The invention will be described further in detail and by way of example with reference to the accompanying drawings, in which:

Figure 1 is a view of a variometer in accordance with the invention in section on a plane perpendicular to the axis of rotation of its rotor, Figure 2 is a diagrammatic representation showing the windings and magnetic coupling of a normal variometer in accordance with the invention, Figure 3 illustrates a modified construction with flux measuring windings in addition to the main windings, and Figure 4 is a wiring diagram showing the variometer with the rotor and stator windings connected in series.

Referring to Figure 1, I is the stator furnished with a winding 2, 3 is the rotor furnished with a winding 4 and mounted on a spindle 5 so that it may be rotated.

The windings, as will be seen, of each of the two members are located in two slots diametrically opposite each other and extending in a direction parallel with the axis of the variometer, the slot openings 6 in the stator and the slot openings 7 in the rotor being kept as narrow as is consistent with the practical construction of the parts, so that the windings are substantially enclosed by the magnetic material of the rotor or stator as the case may be. The remainder of the adjacent surfaces of the rotor and stator are, as will be seen, truly cylindrical and are coaxial with each other within practical limits.

In Figure 2, 2 may be taken as the winding of the stator and 4 the winding of the rotor, 8 representing the cores of these two elements which are built up of laminations as usual.

In Figure 3, 2 and 4 illustrate respectively the normal windings of the stator and rotor, 8 the cores and 9 and 10 flux measuring windings which are provided in addition to the main windings.

In Figure 4, as will be seen, the windings of the stator and rotor are connected in series by the lead 11.

I claim:

1. A single phase variometer or induction regulator comprising a stator and a rotor, a winding of the stator and a winding of the rotor each concentrated in two slots diametrically opposite each other and extending in a direction parallel with the axis of the stator and rotor, the windings being completely enclosed by the magnetic material of the stator and rotor except for an opening in each of the slots narrow in relation to the maximum circumferential dimensions of the slots, and the remainder of the adjacent surfaces of the rotor and stator respectively, apart from the slots, being truly cylindrical and coaxial with each other within the practical limits of manufacture, the openings in the slots being sufficiently narrow for these cylindrical surfaces to extend around substantially 360 degrees of circumference.

2. A variometer or induction regulator as claimed in claim 1, in which the magnetic core material of which the stator and rotor are made is of high permeability laminations and the air gap between the stator and rotor is long enough to be the controlling factor in the passage of flux from one to the other.

3. A variometer or induction regulator as claimed in claim 2, in which additional windings are provided.

4. A variometer or induction regulator as claimed in claim 2, in which the windings of the stator and rotor are connected in series.

5. A single-phase variometer or induction regulator comprising a stator having two substantially 180° pole faces and a rotor having two substantially 180° pole faces, two slots in the stator diametrically opposite each other and extending in a direction parallel with the axis of the rotor, two slots in the rotor diametrically opposite each other and extending in a direction parallel with the axis of the rotor, a winding of the stator passing through the stator slots and at least substantially completely surrounded by the stator in its passage through the slots, and a winding of the rotor passing through the rotor slots and at least substantially completely surrounded by the rotor in its passage through the slots.

JOHN BELL.

REFERENCES CITED

The following references are of record in the file of this patent:

UNITED STATES PATENTS

| Number | Name | Date |
| --- | --- | --- |
| 508,657 | Thompson | Nov. 14, 1893 |
| 1,500,082 | Langdon-Davies et al. | July 1, 1924 |
| 1,657,445 | Suter | Jan. 24, 1928 |
| 1,897,415 | Barbour | Feb. 14, 1933 |
| 2,270,178 | Weis et al. | Jan. 13, 1942 |